United States Patent [19]
> Bertozzi

[11] 4,097,299
[45] Jun. 27, 1978

[54] ELEMENTAL SULFUR HAVING IMPROVED IMPACT RESISTANCE

[75] Inventor: Eugene Ribello Bertozzi, Yardley, Pa.

[73] Assignee: Thiokol Corporation, Newtown, Pa.

[21] Appl. No.: 714,162

[22] Filed: Aug. 13, 1976

[51] Int. Cl.² .................... C07G 17/00; C08G 75/10
[52] U.S. Cl. ........................... 106/287.32; 260/67 S; 260/609 R
[58] Field of Search ............... 106/287 SC; 260/67 S, 260/607 C, 609 R, 79.1, 608; 108/287 SC

[56] References Cited

U.S. PATENT DOCUMENTS 3,422,077   1/1969   Bertozzi et al. ............... 260/79.1
3,997,614  12/1976   Lenke ........................... 260/609

*Primary Examiner*—Theodore Morris
*Attorney, Agent, or Firm*—Stanley A. Marcus; Royal E. Bright

[57] ABSTRACT

Polysulfide-polyether and polysulfide-polyformal polymers having terminals inert to oxidative curing dissolve rapidly in molten elemental sulfur resulting in improved impact strength for the cooled solidified product.

9 Claims, No Drawings

ELEMENTAL SULFUR HAVING IMPROVED IMPACT RESISTANCE

BACKGROUND OF THE INVENTION

Due to various considerations including increased recovery of sulfur contaminating other materials because of stricter environmental controls, the supply of elemental sulfur greatly exceeds present demand. Because of its abundance and low cost the use of sulfur in construction of buildings and roads and for roadway markers has been desired for some time. Elemental sulfur per se is, however, too brittle to use directly for these purposes and considerable effort has been put forth to find additives which, without markedly increasing the cost of the final product, would serve to modify the brittleness of sulfur increasing its impact resistance and render it commercially useful.

The commercially available liquid polysulfide polymers as well as an experimental styrene based polysulfide polymer have been reported as being among those agents which have been employed as sulfur modifiers for various purposes. U.S. Pat. No. 3,316,115 illustrates the use of a liquid polysulfide polymer and a styrene polysulfide polymer to modify sulfur in preparing a road marker composition. Dale in "Advances in Chemical Science" No. 110, Sulfur Research Trends, Chapter 15 page 201, Chemical-Mechanical Alteration of Elemental Sulfur (ACS) gives a review of the problems involved and success achieved in permanent modification of the mechanical properties of the element.

While good results are known to be obtainable using commercial polysulfide polymers and styrene polysulfide polymers, these materials apparently are oxidized by the sulfur as evidenced by $H_2S$ evolution when the commercial polysulfide polymer is mixed with molten sulfur and its continued evolution from the cooled product. Mixing of styrene polysulfide polymer with sulfur is accompanied by the same effect obtained on mixing styrene monomer with sulfur, that is, noticeable evolution of styrene both from the molten mixture and from the cooled product.

The present invention relates to polysulfide polymers based on polyethers and polyformals which have terminals not subject to oxidative curing and which blend well with molten sulfur without evolution of noxious by-products in the molten solid state and which give a permanent increase to the fracture resistance of the elemental sulfur with which they are combined.

SUMMARY OF THE INVENTION

The invention provides a composition of matter which is a copolymer of sulfur and a liquid polyether- or polyformal-polysulfide based polymer having terminals non-oxidatively curable by sulfur.

The tangible embodiments of this aspect of the invention possess the inherent applied use property of having enhanced impact resistance when compared with elemental sulfur in standard impact tests thus evidencing their usefulness in road marker compositions, as subbases for roadways; as replacements for mortar in building construction, as replacements for portland cement in aggregate concrete, and in sulfur asphalt aggregate paving material for highways.

Preferred embodiments of this aspect of the invention are those wherein the polyether- or polyformal-polysulfide based polymer is prepared from dithiodiglycol. Particularly preferred are those embodiments wherein the dithiodiglycol is self condensed to form a polyether-polysulfide based polymer and those wherein the dithiodiglycol is condensed with formaldehyde to form a polyformal-polysulfide polymer.

Special mention is made of either polyether polysulfide polymers or polyformal polysulfide polymers wherein the non-oxidatively curable terminals are hydroxyl groups, alkyl carboxylic ester groups of 2–20 carbon atoms, alkyl ether groups of 1–20 carbon atoms or styrene polysulfide groups.

The invention provides in a process aspect, a process for the enhancement of the impact strength of elemental sulfur which comprises the incorporation into elemental sulfur of a plasticizing amount of a polyether- or polyformal-polysulfide based polymer having terminals non-oxidatively curable by sulfur.

The invention further provides in another composition aspect, elemental solid sulfur having improved impact resistance prepared by the incorporation into solid elemental sulfur a plasticizing amount of a polyether- or polyformal-polysulfide based polymer having terminals non-oxidatively curable by sulfur.

DESCRIPTION OF THE PREFERRED EMBODIMENT

The preparation of the compositions of the invention will be illustrated by reference to the preparation of a specific embodiment thereof, namely a 2-ethyl-hexyloxy terminated polyformal-polysulfide-sulfur polymer.

To prepare this compound, elemental sulfur and a liquid polymer of about 4800 molecular weight, prepared by acid condensation of dithiodiglycol, formaldehyde and 2-ethylhexanol, are warmed until molten. The mixture is maintained in the molten condition, conveniently at about 120° C to about 150° C, while stirring for a period of time long enough to assure that a homogeneous mixture will result on cooling, conveniently about ½ hour. The exact time and temperature are not critical as long as a molten condition is maintained during the reaction period, excessive heat is not applied to cause substantial apparent degradation of the compounds present, and sufficient time is allowed so that on cooling a homogeneous product is obtained.

While the process for the preparation of specific embodiments of the invention has been illustrated by the use of 2-ethyl-hexyloxy terminated polyformal-polysulfide-polymer, it will be obvious to one skilled in the art to substitute for that particular polymeric starting material any of the other polymeric starting materials contemplated to be useable in the invention. These polymers are conveniently prepared from polythiodiglycols. These polythiodiglycols have the structure:

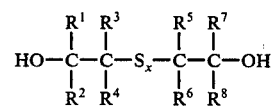

wherein $R^1$, $R^2$, $R^3$, $R^4$, $R^5$, $R^6$, $R^7$ and $R^8$ are hydrogen, methyl or ethyl, or each independently are hydrogen, methyl, ethyl or chloromethyl and $x$ is about 2 to about 5. A particularly useful example is dithiodiglycol $HOC_2H_4S_2C_2H_4OH$. Dithiodiglycol may be prepared by a number of well-known methods, among them being that of U.S. Pat. No. 2,527,378. Suitable manufacturing methods for polythiodiglycols are disclosed in U.S. Pat. No. 2,754,333 and German Patent No. 1,093,790.

Polymerization may be effected by polyetherification to an ether polymer with —OH terminals:

n HOCH$_2$CH$_2$S$_x$CH$_2$CH$_2$OH →
HO(CH$_2$CH$_2$S$_x$CH$_2$CH$_2$O)$_n$H + H$_2$O, or by copolymerization with formaldehyde to yield a polyformal also with —OH terminals:

n HOCH$_2$CH$_2$S$_x$CH$_2$CH$_2$OH + n CH$_2$O →
HO(CH$_2$CH$_2$S$_x$CH$_2$CH$_2$OCH$_2$O)$_{n-1}$
CH$_2$CH$_2$S$_x$CH$_2$CH$_2$OH + nH$_2$O.

In both cases an acid catalyst is used as well as a standard means of removing the water of reaction until the desired polymer molecular weight is achieved.

Inert terminals other than hydroxyl may be introduced by incorporating the monofunctional precursor therefor in the polymerization reaction mixture. For example, incorporation of a lower alkanol will lead to a lower alkyl ether terminal, incorporation of a lower alkyl carboxylic acid will lead to a lower alkyl carboxylic ester terminals, incorporation of a styrene sulfur adduct formed by treating one mole of styrene with four moles of elemental sulfur will result in a styrene polysulfide terminal.

It will similarly be obvious to one skilled in the art that a commercial liquid polysulfide polymer which has been treated by heat and acid to invert its usual thiol terminals to hydroxyl terminals will also be suitable for use in this invention and that compositions formed between these latter liquid polymers and sulfur will be the full equivalents of the other compositions of the invention.

The polyether- or polyformal-polysulfide based polymer may be incorporated in any amount sufficient to give the plasticity to the elemental sulfur desired. It may be incorporated in the range of 2–50 pph and preferable from about 5–10 pph of sulfur.

Other conventional additives to further strengthen and/or adapt the mixture to a particular function may be added. For example, biocidal agents to resist microbiological attack, fiberglass or other fibers for increased structural strength, aggregate or sand for road foundations, or pigments to color the mixture for road markers may be added.

To determine the impact resistance of the compositions of the invention, a particular composition in the molten state may be cast into a 24 cavity compression set mold (ASTM D-395). As the cakes solidify additional molten material may be added dropwise to prevent the formation of hollow centers. After trimming the samples even with the top of the mold and extruding them from it, they are then aged at room temperature for selected time periods. The resistance of the samples to fracture is then determined by suspending the sample on fulcrums located a short distance toward the center from each end and allowing a weight of known mass to fall from a known height and strike the center of the sample. When tested in this fashion elemental sulfur and the exemplary compositions of this invention gave the following results.

| Material | Parts Additive per 100 parts sulfur | Impact for Fracture (Inch Pounds) Aging Period | | | |
|---|---|---|---|---|---|
| | | 1 Day | 1 Week | 2 Weeks | 4 Weeks |
| Sulfur | | 0.25 | 0.25 | 0.25 | 0.25 |
| Sulfur + Styrene terminated dithiodiglycol polyformal (Ex. 2) | 2 | 2.5 | 2.13 | 1.75 | 0.75 |
| | 5 | 3.25 | 3.75 | 2.4 | 2.0 |
| Sulfur + Styrene terminated dithiodiglycol polyformal (Ex. 3) | 2 | 1.75 | 1.75 | 1.2 | 0.75 |
| | 5 | 5.0 | 4.2 | 4.3 | 3.5 |
| | 8 | 7.63 | 9.0 | 6.0 | 5.5 |
| Sulfur + 2-ethylhexanol terminated dithiodiglycol polyformal (Ex. 4) | 2 | 1.5 | 1.6 | 0.75 | 0.9 |
| | 5 | 3.85 | 3.4 | 3.1 | 2.8 |
| | 8 | 4.75 | 4.75 | 4.0 | 2.5 |
| Sulfur + 2-ethylhexanol terminated dithiodiglycol polyformal (Ex. 5) | 2 | 2.4 | 1.8 | 2.0 | 1.25 |
| | 5 | 3.4 | 3.6 | 3.8 | 2.2 |
| | 8 | 8.0 | 10.0 | 9.75 | 7.0 |
| Sulfur + 2-ethylhexanol terminated dithiodiglycol polyether (Ex. 6) | 2 | 2.0 | 1.5 | 1.25 | 0.75 |
| | 5 | 4.1 | 3.2 | 2.6 | 1.4 |
| | 8 | 8.75 | 9.0 | 6.0 | 3.6 |
| Sulfur + Styrene terminated dithiodiglycol polyether (Ex. 7) | 2 | 1.25 | 1.0 | 0.75 | — |
| | 5 | 4.5 | 3.0 | 2.0 | — |
| | 8 | 9.0 | 8.75 | 6.6 | — |
| Sulfur + Hydroxyl terminated dithiodiglycol polyformal | 2 | 1.5 | 1.5 | 1.4 | — |
| | 5 | 3.0 | 2.4 | 2.7 | — |
| | 8 | 8.0 | 8.0 | 8.0 | — |

In using the compositions of the invention they may be substituted in equal proportions for prior art plasticized sulfur in the same applications. For example, the plasticized sulfur may be used in preparing marking compositions as detailed in U.S. Pat. No. 3,316,115. They may also be combined with fine and coarse aggregates while in the molten state to prepare a concrete as detailed in Ludwig "Sulphur Reinforced Systems for Structural Applications" presented at the Interamerican Conference on Materials Technology May 20–24, 1968 San Antonio, Texas, Published in *Materials Technology-An Interamerican Approach* by the American Society of Mechanical Engineers, United Engineering Center, 345 East 47th Street, New York, N.Y. 10017. Sulfur may also be added to asphalt aggregate concrete for road paving purposes. The permissible proportions vary quite extensively but a typical mixture which may be employed consists of about 13% sulfur, 6% asphalt and 81% sand by weight. The compositions of the invention may be substituted for sulfur in these mixtures. The uses of these sulfur asphalt aggregate mixtures, and their preparation, application, and typical properties may be found for example in Fike and Plator *New uses for Sulfur-Their Status and Prospects.* Paper presented at the Flue Gas Desulfurization Symposium, New Orleans, La. May 14–17, 1973. The Sulfur Institute 1725 K Street, N.W., Washington, D.C. and Sulfur: New Uses Needed, Desulfurization-Part 5, Chemical and Engineering News, Aug. 7, 1972, P. 30, J. C. Davis Assoc. Ed.

EXAMPLE 1

Preparation of a hydroxyl terminated dithiodiglycol polyformal

Dithiodiglycol (1555.5 g, 10.0 moles), paraformaldehyde (313.2 g, 9.5 moles), toluene (311.0 g) and concentrated sulfuric acid (3.0 g) were heated at reflux while collecting water which azeotropes with the solvent. After 238.6 g of water had been collected, the toluene was distilled in vacuo at about 6 mm Hg pressure to a final pot temperature of 125° C.

Analysis: Acid No. 0.31 OH No. 46.99 = 1.43% OH.

EXAMPLE 2

Preparation of a styrene polysulfide terminated dithiodiglycol polyformal

Dithiodiglycol (518.5 g, 3.33 moles), paraformaldehyde (98.9 g, 3.0 moles), styrene sulfide of rank 4 [prepared by treating styrene monomer (1 mole) with elemental sulfur (4 moles)] (154.7 g, 0.67 moles), toluene (150 g), and sulfuric acid (1.0 g) were heated at reflux while collecting water until 66.5 g of water (containing some formaldehyde) was collected. Additional toluene (100 g) and sulfuric acid (1.0 g) were added immediately upon observing that formaldehyde was distilling from the reaction. When no more water was obtained for the reaction the toluene was distilled in vacuo at about 10 mm Hg to a final pot temperature of 120° C. The dark viscous product weighed 685.6 g.

Analysis: S, 43.0%; Acid No. 0.7; OH No. 12.3 = 0.39% OH.

EXAMPLE 3

Preparation of a styrene polysulfide terminated dithiodiglycol polyformal using one-half the amount of styrene sulfide Following the procedure and quantities of Example 2 but substituting (77.4 g, 0.335 moles) of styrene sulfide of rank 4 for the quantity used therein, 596.0 g of a dark viscous liquid was obtained.

Analysis: S, 40.35%; Acid No. 0.46% OH No. 19.6 = 0.61% OH.

EXAMPLE 4

Preparation of a 2-ethylhexanol derived ether terminated dithiodiglcyol polyformal Dithiodiglycol (518.5 g, 3.33 moles), paraformaldehyde (94.7 g, 3.0 moles), 2-ethylhexanol (87.3 g, 0.67 moles), toluene (250.0 g) and concentrated sulfuric acid (2.0 g) were refluxed while collecting the water (containing some formaldehyde) which distilled (76.5 moles). Toluene was distilled in vacuo to a maximum pot temperature of 124° C. An amber syrupy liquid (619.5 g, 96.2%) was obtained.

Analysis: S, 35.49; Acid No. 0.44; OH No. 28.52 = 0.88% OH.

EXAMPLE 5

Preparation of a 2-ethylhexanol derived ether terminated dithiodiglycol polyformal using one-half the amount of 2-ethylhexanol Following a procedure analogous to that of Example 4 and using the qualities set forth therein but substituting 43.7 g (0.335 moles) 2-ethylhexanol for the quantity used therein, 575.0 g (96.1%) of an amber syrupy liquid was obtained.

Analysis: S, 38.52%; Acid No. 0.5; OH No. 22.79 = 0.71% OH.

EXAMPLE 6

Preparation of a 2-ethylhexanol derived ether terminated dithiodiglycol polyether Dithiodiglycol (518.5 g, 3.33 moles), 2-ethylhexanol (87.3 g, 0.67 moles), toluene (250 g) and concentrated sulfuric acid (2.0 g) were heated at reflux while collecting 68.6 g of water which distilled. Toluene was then removed in vacuo at 12 mm Hg pressure and a final pot temperature of 121° C. A dark liquid containing some insolubles was obtained (533.8 g, 98.5%).

Analysis: S, 39.71%; Acid No. 1.3; OH No. 1.6 = 0.09% OH.

EXAMPLE 7

Preperation of a styrene polythio terminated dithiodiglycol polyether

Dithiodiglycol (518.5 g, 3.33 moles), styrene sulfide of rank 4 (154.7 g, 0.67 moles), toluene (250.0 g) and concentrated sulfuric acid were heated at reflux while water (63.4 g) which distilled over was collected. Removal of the toluene in vacuo at 10–15 mm Hg pressure and a final pot temperature of 130° C gave a gel-like dark material (603.9 g, 98.2%).

Analysis: S, 47.99; Acid No. 1.64 (Incomplete Solution); OH No. 10.18 = 0.36% OH.

EXAMPLE 8

Experimental formulations were prepared plasticizing sulfur with the commercial liquid polysulfide polymer of U.S. Pat. No. 3,316,115 (A) the styrene polysulfide polymer of the same patent (B), a dithiodiglycol polyformal (Ex. 1) (C), a hydroxyl terminated dithiodiglycol polyether (D) in various quantities and mixtures both with and without $CaCO_3$. The results obtained are as follows:

| Composition | Impact (In.-Lbs.) After 1 Week | Other Observed Characteristics |
| --- | --- | --- |
| 88.0 parts sulfur + 5.0 parts A | 7.5 | positive $H_2S$ test (Lead Acetate) |
| 88.0 parts sulfur + 5.0 parts A + 0.5 parts $CaCO_3$ | 4.0 | positive $H_2S$ test |
| 88.0 parts sulfur + 5.0 parts B + 0.5 parts $CaCO_3$ | 4.25 | positive $H_2S$ test |
| 88.0 parts sulfur + 5.0 parts C | 6.5 | paraformaldehyde odor no $H_2S$ test |
| 88.0 parts sulfur + 5.0 parts C + 0.5 parts $CaCO_3$ | 5.5 | no odor, no $H_2S$ test |
| 88.0 parts sulfur + 5.0 parts D | 6.0 | no odor, no $H_2S$ test |
| 88.0 parts sulfur + 5.0 parts D + 0.5 parts $CaCO_3$ | 6.0 | no odor, no $H_2S$ test |
| 88.0 parts sulfur + 5.0 parts B + 0.5 parts $CaCO_3$ | 0.75 (72 hrs.) | Styrene odor, no $H_2S$ test |
| 100.0 parts sulfur + 30.0 parts C | soft but does not flow | paraformaldehyde odor, no $H_2S$ test |

The subject matter which applicant regards as his invention is particularly pointed out and distinctly claimed as follows:

1. A composition of matter which is a copolymer comprising the product of the reaction in the molten state of elemental sulfur and from 2 to 50 parts per hundred of a liquid polyformal-polysulfide polymer having terminals non-oxidatively curable by sulfur.

2. A composition as defined in claim 1 wherein the polyformal-polysulfide based polymer is prepared by condensation of dithiodiglycol with formaldehyde.

3. A process for the enhancement of the impact strength of elemental sulfur which comprises the incorporation into elemental sulfur of a plasticizing amount of a liquid polyformal-polysulfide based polymer having terminals non-oxidatively curable by sulfur.

4. A process as defined in claim 3 wherein the polyformal-polysulfide based polymer is prepared from dithiodiglycol.

5. Elemental solid sulfur having improved impact resistance when prepared by incorporating into said elemental sulfur a plasticizing amount of a polyformal-polysulfide based polymer having terminals non-oxidatively curable by sulfur.

6. A composition as defined in claim 2 wherein the polyformal-polysulfide based polymer has terminals which are hydroxyl groups.

7. A composition as defined in claim 2 wherein the polyformal-polysulfide polymer has terminals which are alkyl ether groups of 1–20 carbon atoms.

8. A composition as defined in claim 2 wherein the polyformal-polysulfide polymer has terminals which are alkyl carboxylic ester groups of 2–20 carbon atoms.

9. A composition as defined in claim 2 wherein the polyformal-polysulfide polymer has terminals which are styrene polysulfide groups.

* * * * *